Dec. 10, 1963   J. L. BRUSCA   3,113,810
SHAFT BEARING

Filed April 11, 1962   2 Sheets-Sheet 1

INVENTOR.
Joseph L. Brusca,
BY
Paul & Paul
ATTORNEYS.

Dec. 10, 1963                J. L. BRUSCA                3,113,810
                             SHAFT BEARING
Filed April 11, 1962                                2 Sheets-Sheet 2
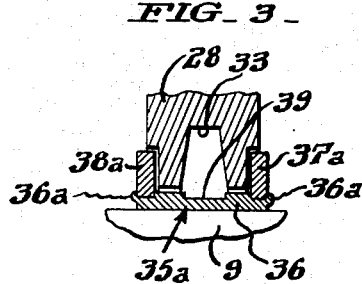
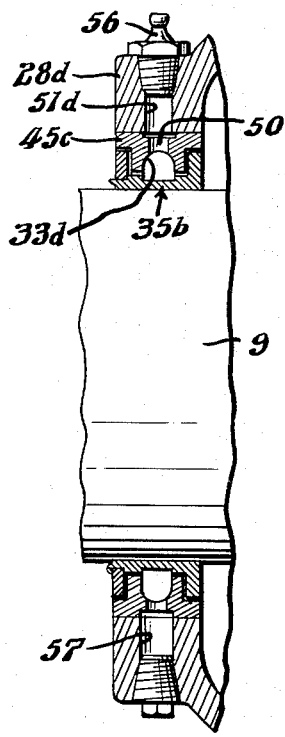
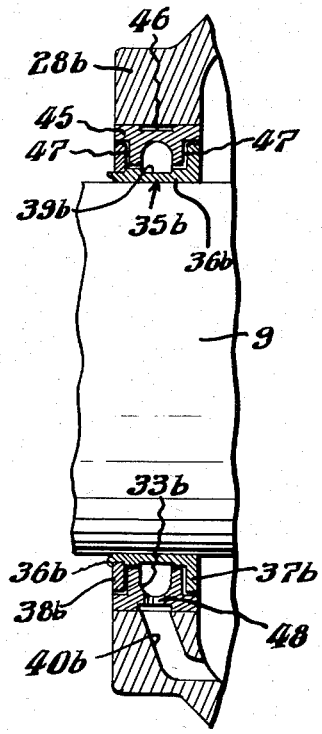
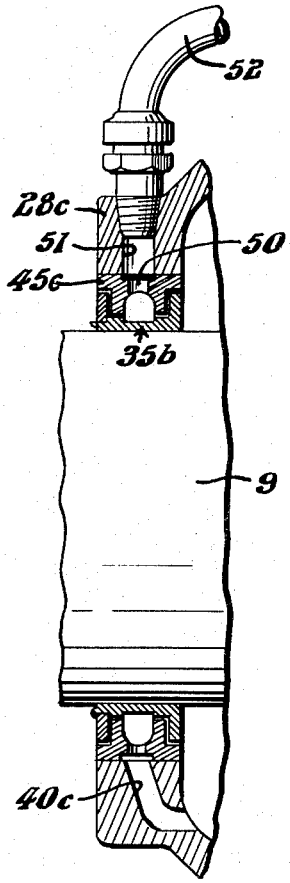
INVENTOR.
Joseph L. Brusca,
BY
Paul & Paul
ATTORNEYS.

United States Patent Office 3,113,810
Patented Dec. 10, 1963

3,113,810
SHAFT BEARING
Joseph L. Brusca, Cheltenham, Pa., assignor to Colgate Bearings, Inc., Southampton, Pa., a corporation of Pennsylvania
Filed Apr. 11, 1962, Ser. No. 186,687
5 Claims. (Cl. 308—36.1)

This invention relates to shaft bearings. More particularly, it is concerned with bearings of the split and solid pillow block and flanged units having hollow housings within which the shafts are rotatively supported with interposition of revolving elements such as balls or rollers. As ordinarily constructed, the split housings of such bearings are formed with integral end walls, and therefore require blind boring of the bearing seats within the housings. Moreover, for visual inspection of the interiors of such bearings, it is necessary to remove the upper components of the housings; and when replacements of internal parts are required the shafts must be lifted after removal of the upper housing components to clear the outer race portions of the lower housing components. This procedure is quite difficult in many instances since the clearance afforded is inadequate to permit the required amount of radial displacement of the shafts.

One of the aims of my invention is to obviate the above mentioned drawbacks. This objective is realized in practice, as hereinafter more fully disclosed, by providing the housing of a bearing of the kind referred to, at least at one end thereof, with a removable cover which is easily and quickly detached and thereafter slidable outwardly along the shaft, with the result that the parts at the interior are made accessible for visual inspection or for ready replacement, as may be desired or necessary.

Another object of my invention is to provide, as an incorporated part of the removable end cover, an improved sealing means for preventing leakage of lubricant around the shaft from within the housing, and at the same time preventing ingress of foreign matter into the housing from the exterior.

Other objects and attendant advantages will appear from the following description of the attached drawings wherein:

FIGS. 3, 4, 5, 6 are fragmentary detail sectional views showing various modifications of my invention.

Figure 1:
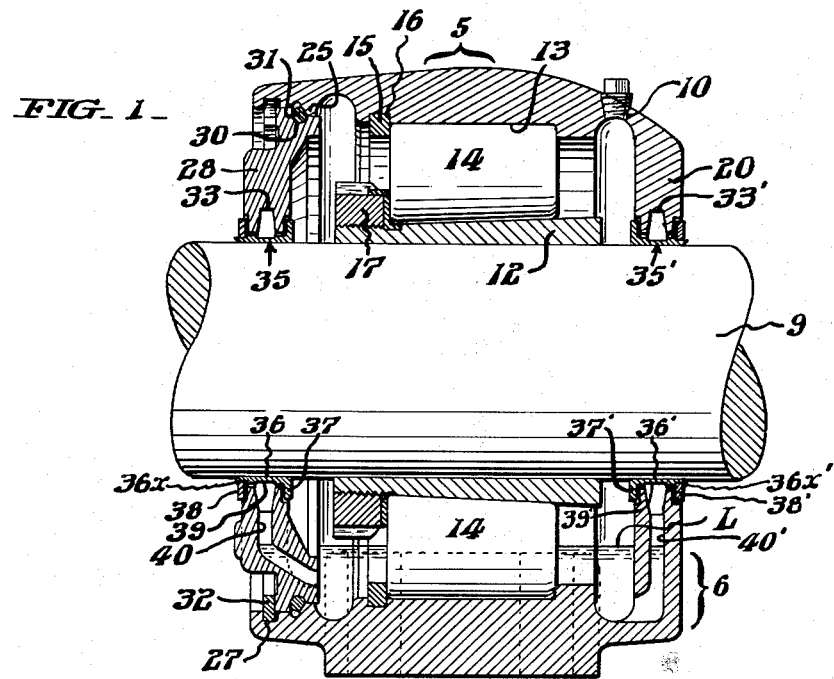
FIG. 1 shows, in longitudinal section, a shaft bearing embodying my invention in one form.
Figure 2:
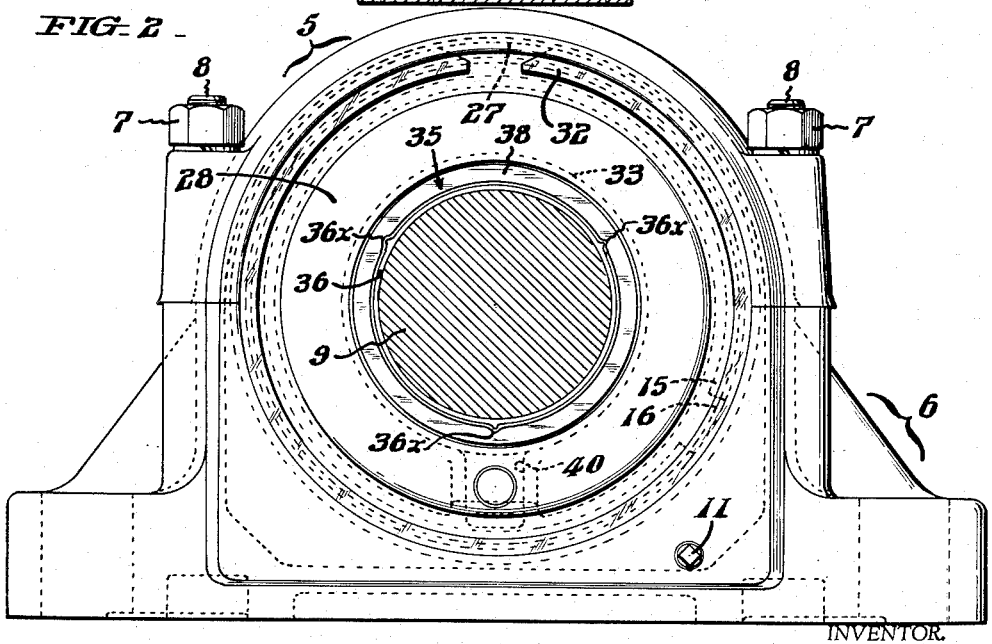
FIG. 2 is an end view of the bearing as seen from the left of FIG. 1.

With more specific reference, first more particularly to FIGS. 1 and 2 of these drawings, the bearing there exemplified is of the split-pedestal or pillow block type of which the upper component 5 is secured to the lower component 6 by means of nuts 7 engaged with stud bolts 8 upstanding from said lower component. These two components 5 and 6 together provide a hollow housing through which the shaft 9 extends, and which affords in the bottom thereof, a sump for lubricating oil normally maintained approximately at the level indicated at L. At the top, the housing is provided as shown in FIG. 1, with a plugged hole 10 through which the lubricant can be replenished from time to time as may be necessary, and at the bottom with a plugged drain hole as shown at 11 in FIG. 2. After common practice in antifriction bearings, there is secured upon the shaft 9 within the housing a sleeve 12, and disposed between said sleeve and the machined annular surface 13 of the housing, is an anti-friction ball or roller bearing 14 which is not shown in detail. Also, after common practice in the art and as illustrated, the bearing 14 is held against displacement endwise by means of a split stop ring 15 engaged in an internal circumferential groove 16 of the housing, and a backing nut 17 threadedly engaged about the lefthand end of the sleeve 12. As further shown, the housing is closed at one end by a fixed wall 20 jointly provided by the two components 5 and 6. In accordance with my invention, the opposite end of the housing is made open and provided somewhat inward of its open end with an internal circumferential rib 25 of which the outer face is beveled, and also outward beyond said shoulder with an internal square section circumferential groove 27. Fitting into the open end of the housing is a one-piece retractable circular cover 28 having an axial shaft clearing aperture therein and a peripheral groove 30, which although shown as semi-circular may be square in cross section. Lodged in the peripheral groove 30 of the cover 28 is a band of resilient material in the form of an O-ring 31. The cover 28 is held in place by a split metallic retaining ring 32 sprung into the internal circumferential groove 27 of the housing with the O-ring 31 pressed into fluid-tight engagement with the beveled outer face of the rib 25. The cover 28 is held against rotating with the shaft 9 by frictional engagement with the O-ring 31 as will be readily understood. The shaft clearing aperture in the cover 28 is circumferentially grooved as at 33; and incorporated with the cover in accordance with my invention to prevent lubricant leakage around the shaft at the axial aperture in the cover, is a spool-like sealing element 35 having a sleeve portion 36 which has a slide fit on the shaft, and end retaining flanges 37 and 38 that lap the inner and outer faces of said cover with slight clearances therebetween. It is also to be noted that there is a slight annular clearance between the sleeve portion of the element 35 and the shaft aperture in the cover 28. In FIG. 1, the spool-like element 35 is made up of two parts—one in which the stop flange 37 is integral with the tubular sleeve portion 36, and the other of which is in the form of a ring held in assembly by staking or peening over upon it at circumferential intervals, an annular lip projection at the distal end of said sleeve portion as at 36x in FIG. 2. For a purpose later on explained, the tubular portion 36 of the spool-like sealing element 35 is formed centrally with a relatively shallow circumferential depression 39.

Leading down from the annular channel 33 around the shaft aperture in the cover 28 is a duct 40 which is open at the bottom to the lubricant sump in the base of the bearing housing. During rotation of the shaft 9, the oil carried up thereto and finding its way past the inner flange 37 of the sealing means 35 and into the circumferential depression 39 of the seal, will be thrown by centrifugal force into the channel 33 about the axial aperture at the cover and drain back into the sump via the duct 40, while extraneous foreign matter is prevented from entering by the external flange 38 of the sealing means. As shown, a sealing means 35' similar to the one described, may be used in the wall 20 at the opposite end of the bearing housing, and the shaft opening in said wall formed with a circumferential channel 33' from which lubricant carried up to the shaft drains back to the sump by way of the duct 40' in said wall.

When access to the parts at the interior of the bearing is necessary for any reason, it is easily and quickly had by first removing the spring ring 32 and then bodily withdrawing the cover 28 together with the incorporated sealing means 35 outwardly along the shaft 9.

In the modified form of labyrinth seal illustrated in FIG. 3, both flanges of the spool-like element 35a are made as separate rings 37a and 38a which are held in place by peening over annular lip projections at opposite ends of the sleeve portion as at 36a.

In the modification of FIG. 4, the sealing means comprises, in addition to a spool-like element 35b similar to that of FIG. 1, a surrounding supplemental ring 45 for the reception of which the cover 28b is provided with a plain bored axial aperture. As shown, the ring 45 is substantially U-shaped in cross section, provided with a relatively shallow perimetric groove 46, and is recessed at opposite sides as at 47 and lapped by the flanges 37b and 38b of the spool-like element 35b, it being proportioned for provision of slight circumferential and lateral clearances between it and said element. Here, as in the first described embodiment, the lubricant carried up to the shaft and collecting in the shallow circumferential groove 39b of the spool-like element is slung by centrifugal force into an annular channel 33b—here provided by the ring 45—and conducted, by way of one of several evenly spaced holes 48 in said ring and a duct 49b in the cover 28b, back into the sump in the bottom of the bearing housing.

In the modification illustrated in FIG. 5, the construction of the seal is identical with that of FIG. 4, except that here the ring 45c is provided with several holes 50 equally spaced around the circumference of the shallow perimetric groove, for communication with a downward passage 51 in the upper part of the cover 28c.

Connecting into the passage 51 is a tube 52. It is to be understood that a similar construction is incorporated in the opposite end wall of the housing, the two seals then being connected to by-pass air from one seal to the other without disturbing the air pressure in the bearing chamber. An example of high velocity air flowing over the bearing is an industrial forced draft fan with an open inlet on one side. If the air flow is not by-passed over the bearing housing, the lubricant will be blown out of the oil reservoir through the seal at the opposite end.

In the alternative embodiment of FIG. 6, the construction of the seal is identical with that of FIG. 5, but in this instance, a fitting 56 is screwed into the downward passage 51d by means of which a solid lubricant or grease can be injected into the annular channel 33d of the ring 45c. Moreover, in this instance the wall or cover 28d, instead of having a drain duct at the bottom as in the previous embodiment, is provided with a plugged hole 57 through which the grease can be withdrawn from time to time, for replacement by a fresh supply.

In the various forms of labyrinth seals which I have illustrated, both the stationary and the rotary or spool-like elements may be fashioned from solid machine parts, from pressed metal or from other suitable materials.

It will also be apparent that the modified seals of FIGS. 4–6 can be made up as units, with the parts pre-assembled ready to be pressed into, bolted, or otherwise secured to the walls of shaft bearing housings.

While in accordance with the provisions of the statutes, I have illustrated and described the best forms of embodiment of my invention now known to me, it will be apparent to those skilled in the art that changes may be made in the form of the apparatus described without departing from the spirit and scope of the invention as set forth in the appended claims, and that in some cases certain features of my invention may be used to advantage without a corresponding use of other features.

Having thus described my invention, I claim:

1. In a bearing for a shaft, a hollow housing open at one end and provided internally at said open end with a circumferentially extending shoulder, a ring of resilient sealing material overlying said shoulder, a cover within the opening in said housing, said cover being provided with an opening for the shaft, means for holding the cover with its outer peripheral area engaged with said ring of resilient material and with the latter in fluid-tight engagement with said shoulder, sealing means for preventing leakage of lubricant around the shaft at the opening therefor in said cover including a spool-like element having a circumferentially continuous main body adapted for slidably fitting over said shaft, and a pair of flanges respectively at opposite ends thereof, said cover including means extending about the inner periphery thereof and embracing said main body of the spool-like element with a slight clearance therebetween, the last mentioned means including a pair of annular recesses respectively on opposite sides thereof and respectively receiving said flanges with a slight clearance between each of said flanges and said last mentioned means, said main body of the spool-like element and said last mentioned means being provided with opposed grooves conjointly forming a channel disposed between said recesses and extending about said main body of the spool-like element, and means for draining said channel.

2. In a bearing for a shaft, a hollow housing open at one end and provided internally at said open end with a circumferentially extending shoulder, a ring of resilient sealing material overlying said shoulder, a cover within the opening in said housing, said cover being provided with an opening for the shaft, means for holding the cover with its outer peripheral area engaged with said ring of resilient material and with the latter in fluid-tight engagement with said shoulder, sealing means for preventing leakage of lubricant around the shaft at the opening therefor in said cover including a spool-like element having a circumferentially continuous main body adapted for slidably fitting over said shaft, and a pair of flanges respectively at opposite ends thereof, said cover including means extending about the inner periphery thereof and embracing said main body of the spool-like element with a slight clearance therebetween, the last mentioned means including a pair of annular recesses respectively on opposite sides thereof and respectively receiving said flanges with a slight clearance between each of said flanges and said last mentioned means, said main body of the spool-like element and said last mentioned means being provided with opposed grooves conjointly forming a channel disposed between said recesses and extending about said main body of the spool-like element, and a duct in said cover for draining said channel into the bottom of the hollow interior of said housing.

3. In a bearing for a shaft, a hollow housing open at one end and provided internally at said open end with a circumferentially extending shoulder, a ring of resilient sealing material overlying said shoulder, a cover within the opening in said housing, said cover being provided with an opening for the shaft, means for holding the cover with its outer peripheral area engaged with said ring of resilient material and with the latter in fluid-tight engagement with said shoulder, sealing means for preventing leakage of lubricant around the shaft at the opening therefor in said cover including a spool-like element having a circumferentially continuous main body adapted for slidably fitting over said shaft, and a pair of flanges respectively at opposite ends thereof, said cover including a ring member extending about the inner periphery thereof and embracing said main body of the spool-like element with a slight clearance therebetween, said ring member including a pair of annular recesses respectively on opposite sides thereof and resepectively receiving said flanges with a slight clearance between each of said flanges and said ring member, said main body of the spool-like element and said ring member being provided with opposed grooves conjointly forming a channel disposed between said recesses and extending about said main body of the spool-like element, and a duct in said cover for draining said channel into the bottom of the hollow interior of said housing.

4. In a bearing for a shaft, a hollow housing open at one end and provided internally at said open end with a circumferentially extending shoulder, a ring of resilient sealing material overlying said shoulder, a cover within the opening in said housing, said cover being provided with an opening for the shaft, means for holding the cover with its outer peripheral area engaged with said ring of resilient material and with the latter in fluid-tight engagement with said shoulder, sealing means for preventing leakage of lubricant around the shaft at the opening therefor in said cover including a spool-like element having a circumferentially continuous main body adapted for slidably fitting over said shaft, and a pair of flanges respectively at opposite ends thereof, said cover including a ring member extending about the inner periphery thereof and embracing said main body of the spool-like element with a slight clearance therebetween, said ring member including a pair of annular recesses respectively on opposite sides thereof and respectively receiving said flanges with a slight clearance between each of said flanges and said ring member, said main body of the spool-like element and said ring member being provided with opposed grooves conjointly forming a channel disposed between said recesses and extending about said main body of the spool-like element, and a plugged duct in said cover for use in draining said channel to the exterior of said cover.

5. In a bearing for a shaft, a hollow housing open at one end and provided internally at said open end with a circumferentially extending shoulder, a ring of resilient sealing material overlying said shoulder, a cover within the opening in said housing, said cover being provided with an opening for the shaft, means for holding the cover with its outer peripheral area engaged with said ring of resilient material and with the latter in fluid-tight gagement with said shoulder, sealing means for preventing leakage of lubricant around the shaft at the opening therefor in said cover including a spool-like element having a circumferentially continuous main body adapted for slidably fitting over said shaft, and a pair of flanges respectively at opposite ends thereof, said cover including a ring member extending about the inner periphery thereof and embracing said main body of the spool-like element with a slight clearance therebetween, said ring member including a pair of annular recesses respectively on opposite sides thereof and respectively receiving said flanges with a slight clearance between each of said flanges and said ring member, said main body of the spool-like element and said ring member being provided with opposed grooves conjointly forming a channel disposed between said recesses and extending about said main body of the spool-like element, a duct in said cover for draining said channel into the bottom of the hollow interior of said housing, and means providing an air bypass passage between said channel and a corresponding channel at the opposite end of said bearing.

References Cited in the file of this patent

UNITED STATES PATENTS

| | | |
|---|---|---|
| 1,839,508 | Staege | Jan. 5, 1932 |
| 1,991,077 | Brittain | Feb. 12, 1935 |
| 2,003,000 | Kelpe | May 28, 1935 |
| 2,032,817 | Svenson | Mar. 3, 1936 |
| 2,052,180 | Okner | Aug. 25, 1936 |
| 2,439,917 | Anderson | Apr. 20, 1948 |
| 2,512,148 | Gaines | June 20, 1950 |
| 2,734,735 | Schanke | Feb. 14, 1956 |
| 2,983,529 | Price | May 9, 1961 |
| 3,004,807 | Kniepkamp | Oct. 17, 1961 |

FOREIGN PATENTS

| | | |
|---|---|---|
| 1,125,933 | France | July 23, 1956 |